United States Patent
Li et al.

(10) Patent No.: US 12,534,297 B2
(45) Date of Patent: Jan. 27, 2026

(54) BOX RETRIEVAL METHOD AND APPARATUS, SYSTEM, ROBOT, AND STORAGE MEDIUM

(71) Applicant: HAI ROBOTICS CO., LTD., Guangdong (CN)

(72) Inventors: Huixiang Li, Guangdong (CN); Ying Zhao, Guangdong (CN); Jui-chun Cheng, Guangdong (CN)

(73) Assignee: HAI ROBOTICS CO., LTD., Guangdong (CN)

( * ) Notice: Subject to any disclaimer, the term of this patent is extended or adjusted under 35 U.S.C. 154(b) by 572 days.

(21) Appl. No.: 18/063,305

(22) Filed: Dec. 8, 2022

(65) Prior Publication Data

US 2023/0108073 A1    Apr. 6, 2023

Related U.S. Application Data

(63) Continuation of application No. PCT/CN2021/099008, filed on Jun. 8, 2021.

(30) Foreign Application Priority Data

Jun. 12, 2020 (CN) .......................... 202010536380.6

(51) Int. Cl.
*B65G 1/137* (2006.01)
*B25J 9/16* (2006.01)
(Continued)

(52) U.S. Cl.
CPC ............ *B65G 1/137* (2013.01); *B25J 9/1676* (2013.01); *B25J 9/1697* (2013.01);
(Continued)

(58) Field of Classification Search
CPC ................ B65G 1/137; B65G 47/905; B65G 2203/0233; B65G 2203/041; G06T 7/73; B25J 9/1676
See application file for complete search history.

(56) References Cited

U.S. PATENT DOCUMENTS 5,325,468 A * 6/1994 Terasaki ................ B25J 9/1669
                                                     700/262
5,835,684 A * 11/1998 Bourne ................... B25J 9/1666
                                                     700/255
(Continued)

FOREIGN PATENT DOCUMENTS

CN     101827764 A     9/2010
CN     102725213 A     10/2012
(Continued)

OTHER PUBLICATIONS

Huiyan Chen, Theory and application of intelligent vehicles, Jul. 31, 2018, p. 21-24, Beijing Institute of Technology Press, China.
(Continued)

*Primary Examiner* — Kyle O Logan
(74) *Attorney, Agent, or Firm* — Ladas & Parry, LLP (57) ABSTRACT

Embodiments of the disclosure provide a box retrieval method and apparatus, a system, a robot, and a storage medium. The method is applied to a warehouse robot, and includes: acquiring a detection image, where the detection image includes an image of a target box and neighboring objects; determining a box spacing between the target box and each neighboring object according to the detection image; and if the box spacing satisfies retrieval conditions for a warehouse robot, retrieving the target box. Automatic detection of the box spacing is achieved with low detection cost and high detection accuracy, and goods is retrieved only when the spacing satisfies conditions, such that goods
(Continued)

retrieval safety is increased, and the probability of goods damage and falling down of shelves during a retrieval process is greatly lowered.

12 Claims, 5 Drawing Sheets

(51) Int. Cl.
  *B65G 47/90* (2006.01)
  *G06T 7/73* (2017.01)
(52) U.S. Cl.
  CPC .............. *B65G 47/905* (2013.01); *G06T 7/73* (2017.01); *B65G 2203/041* (2013.01)

(56) References Cited

U.S. PATENT DOCUMENTS

| | | | | |
|---|---|---|---|---|
| 6,493,607 | B1* | 12/2002 | Bourne | B25J 9/1666 |
| | | | | 700/165 |
| 9,333,649 | B1* | 5/2016 | Bradski | G06V 20/10 |
| 9,576,363 | B2* | 2/2017 | Kim | G06T 7/75 |
| 9,687,983 | B1* | 6/2017 | Prats | B25J 9/1612 |
| 10,207,868 | B1* | 2/2019 | Stubbs | G06Q 10/087 |
| 2002/0182046 | A1* | 12/2002 | Schempf | A01G 9/088 |
| | | | | 414/623 |
| 2005/0135912 | A1* | 6/2005 | Schempf | A01G 9/088 |
| | | | | 414/618 |
| 2013/0245810 | A1* | 9/2013 | Sullivan | B65G 1/1371 |
| | | | | 700/214 |
| 2014/0074288 | A1* | 3/2014 | Satou | G05B 19/4083 |
| | | | | 700/253 |
| 2015/0360882 | A1* | 12/2015 | Girtman | B25J 11/00 |
| | | | | 414/796.5 |
| 2018/0029797 | A1* | 2/2018 | Hance | G05D 1/0234 |
| 2019/0009412 | A1* | 1/2019 | Khan | B25J 9/1697 |
| 2019/0228371 | A1* | 7/2019 | Murphy | B25J 15/0616 |
| 2020/0324986 | A1* | 10/2020 | McMurrough | G06T 17/10 |

FOREIGN PATENT DOCUMENTS

| | | |
|---|---|---|
| CN | 107067206 A | 8/2017 |
| CN | 109132313 A | 1/2019 |
| CN | 109214348 A | 1/2019 |
| CN | 109753070 A | 5/2019 |
| CN | 110076777 A | 8/2019 |
| CN | 110615223 A | 12/2019 |
| CN | 110815202 A | 2/2020 |
| CN | 110834897 A | 2/2020 |
| JP | 200515089 A | 1/2005 |
| JP | 201820423 A | 2/2018 |
| JP | 2019527172 A | 9/2019 |
| WO | WO2016054656 A1 | 4/2016 |
| WO | WO2020006433 A1 | 1/2020 |

OTHER PUBLICATIONS

International Search Report for PCT/CN2021/099008.
Extended European Search Report dated Oct. 24, 2023; Appln. No. 21822679.3.
Notice of Reasons for Refusal of JP2022-575470.
The Reexamination Notice for Chinese Patent No. 202010536380.6 issued on Aug. 26, 2025, and its English translation.
"Research on Digital Imaging Judicial Authentication" by Cheng Yan, pp. 24-25, Law Press, 1st Edition, 1st Printing, Nov. 2019.

* cited by examiner

BOX RETRIEVAL METHOD AND APPARATUS, SYSTEM, ROBOT, AND STORAGE MEDIUM

CROSS-REFERENCE TO RELATED APPLICATIONS

The present application is a continuation of International Patent Application No. PCT/CN2021/099008 filed on Jun. 8, 2021, which claims priority to Chinese Patent Application No. 202010536380.6, filed on Jun. 12, 2020, which is incorporated herein by reference in its entirety.

TECHNICAL FIELD

The disclosure relates to the technical field of intelligent warehousing, and in particular, to a box retrieval method and apparatus, a system, a robot, and a storage medium.

BACKGROUND

A warehouse robot uses an intelligent operating system, realizes automated retrieval and storage of goods according to system instructions, can continuously operate for 24 hours a day, replacing manual management and operations and improving warehousing efficiency, and is widely used and praised.

However, vibrations of shelves or manual operations may cause boxes to be displaced in their storage spaces, resulting in actual box spacings being less than a preset value, and resulting in hidden dangers for the warehouse robot to retrieve goods.

SUMMARY

Embodiments of the disclosure provide a box retrieval method and apparatus, a system, a robot, and a storage medium. Spacing detection is performed by an image sensor provided on a warehouse robot, and goods is retrieved when the spacing satisfies conditions, thereby improving goods retrieval safety.

In a first aspect, the embodiments of the disclosure provide a box retrieval method. The method is applied to a warehouse robot, and includes:
  acquiring a detection image, where the detection image includes an image of a target box and neighboring objects; determining a box spacing between the target box and each neighboring object according to the detection image; and if the box spacing satisfies retrieval conditions for the warehouse robot, retrieving the target box Optionally, the determining a box spacing between the target box and each neighboring object according to the detection image includes:
  performing feature extraction on the detection image to determine a target region corresponding to the target box and neighboring regions corresponding to the neighboring objects in the detection image; and determining the box spacing between the target box and each neighboring object according to positional relationships between the target region and the neighboring regions.

Optionally, the detection image is an image composed of point cloud data, and the determining the box spacing between the target box and each neighboring object according to the positional relationships between the target region and the neighboring regions includes:
  determining the box spacing between the target box and each neighboring object according to coordinates of point cloud data of the target region and coordinates of point cloud data of the neighboring regions.

Optionally, after determining the target region corresponding to the target box and the neighboring regions corresponding to the neighboring objects in the detection image, the method further includes:
  calculating point cloud distances between neighboring point cloud data in the target region and the neighboring regions; clustering the point cloud data of the target region and the neighboring regions according to the point cloud distances, and recognizing whether there is an obstacle between the target region and each neighboring region according to the clustering result; and accordingly, if the box spacing satisfies the retrieval conditions for the warehouse robot, the retrieving the target box includes: if the obstacle recognition result indicates that there is an obstacle, and/or the box spacing does not satisfy the retrieval conditions for the warehouse robot, not retrieving the target box; and if the obstacle recognition result indicates that there is no obstacle, and the box spacing satisfies the retrieval conditions for the warehouse robot, retrieving the target box.

Optionally, after determining the target region corresponding to the target box and the neighboring regions corresponding to the neighboring objects in the detection image, the method further includes:
  recognizing whether there is an obstacle between the target region and each neighboring region; and accordingly, if the box spacing satisfies the retrieval conditions for the warehouse robot, the retrieving the target box includes: if the obstacle recognition result indicates that there is an obstacle, and/or the box spacing does not satisfy the retrieval conditions for the warehouse robot, not retrieving the target box; and if the obstacle recognition result indicates that there is no obstacle, and the box spacing satisfies the retrieval conditions for the warehouse robot, retrieving the target box.

Optionally, the retrieval conditions include a preset width threshold and a preset depth threshold, the box spacing includes spacing width and spacing depth, and the box spacing satisfying the retrieval conditions for the warehouse robot includes:
  the spacing width is greater than the preset width threshold, and the spacing depth is greater than the preset depth threshold. Optionally, the acquiring a detection image of a target box includes:
  acquiring location information of the warehouse robot and a target location of the target box; and capturing the detection image when the distance between the location information and the target location satisfies a set condition.

Optionally, the target box is placed on a shelf; there are two neighboring objects, which are respectively located on the left and right sides of the target box; and the neighboring objects include: two other boxes neighboring to the target box, or one other box neighboring to the target box and a side frame of the shelf neighboring to the target.

In a second aspect, the disclosure further provides a box retrieval apparatus, the apparatus including:
  a detection image acquisition module configured to acquire a detection image, where the detection image includes an image of a target box and neighboring objects; a spacing determination module configured to determine a box spacing between the target box and each neighboring object according to the detection image; and a box retrieval module configured to retrieve the target box if the box spacing satisfies retrieval conditions for a warehouse robot.

Optionally, the spacing determination module includes:

a target region determination unit configured to perform feature extraction on the detection image to determine a target region corresponding to the target box and neighboring regions corresponding to the neighboring objects in the detection image; and a box spacing determination unit configured to determine a box spacing between the target box and each neighboring object according to positional relationships between the target region and the neighboring regions.

Optionally, the detection image is an image composed of point cloud data, and the box spacing determination unit is further configured to: determine the box spacing between the target box and each neighboring object according to coordinates of point cloud data of the target region and coordinates of point cloud data of the neighboring regions.

Optionally, the box retrieval apparatus further includes:

a first obstacle recognition module configured to, after determining the target region corresponding to the target box and the neighboring regions corresponding to the neighboring objects in the detection image, calculate point cloud distances between neighboring point cloud data in the target region and the neighboring regions, and cluster the point cloud data of the target region and the neighboring regions according to the point cloud distances and recognize, according to the clustering result, whether there is an obstacle between the target region and each neighboring region; and accordingly, the box retrieval module further configured to: if the obstacle recognition result indicates that there is an obstacle, not retrieve the target box; if the obstacle recognition result indicates that there is no obstacle, and/or the box spacing does not satisfy the retrieval conditions for the warehouse robot, not retrieve the target box; and if the obstacle recognition result indicates that there is no obstacle, and the box spacing satisfies the retrieval conditions for the warehouse robot, retrieve the target box.

Optionally, the box retrieval apparatus further includes:

a second obstacle recognition module configured to, after determining the target region corresponding to the target box and the neighboring regions corresponding to the neighboring objects in the detection image, recognize whether there is an obstacle between the target region and each neighboring region; and accordingly, the box retrieval module further configured to: if the obstacle recognition result indicates that there is an obstacle, and/or the box spacing does not satisfy the retrieval conditions for the warehouse robot, not retrieve the target box; and if the obstacle recognition result indicates that there is no obstacle, and the box spacing satisfies the retrieval conditions for the warehouse robot, retrieve the target box.

Optionally, the retrieval conditions include a preset width threshold and a preset depth threshold, the box spacing includes spacing width and spacing depth, and the box retrieval module is further configured to:

if the spacing width is greater than the preset width threshold, and the spacing depth is greater than the preset depth threshold, retrieve the target box.

Optionally, the detection image acquisition module is further configured to:

acquiring location information of the warehouse robot and a target location of the target box; and capturing the detection image when the distance between the location information and the target location satisfies a set condition.

In a third aspect, the disclosure also provides a warehousing system, the system including: a warehouse robot, a shelf, and a warehouse management module, where the warehouse robot is connected to the warehouse management module and is configured to move and to retrieve and/or store a target box according to instructions of the warehouse management module, the warehouse robot is provided with an image sensor, the image sensor is configured to acquire a detection image, the detection image includes an image of the target box and neighboring objects, and the target box is placed on the shelf; and the warehouse management module is configured to receive the detection image and to perform the box retrieval method provided by any embodiment of the disclosure.

Optionally, the image sensor is disposed on a goods retrieval device of the warehouse robot.

Optionally, the image sensor includes at least one of a 2D camera, a radar, and a depth camera.

In a fourth aspect, the disclosure also provides a warehouse robot, including: at least one processor and a memory, where the memory stores computer-executable instructions; and the at least one processor executes the computer-executable instructions stored in the memory to cause the at least one processor to perform the box retrieval method provided by any embodiment of the disclosure.

In a fifth aspect, the disclosure also provides a computer-readable storage medium, where the computer-readable storage medium stores computer-executable instructions, and the computer-executable instructions are executed by the processor to implement the box retrieval method provided by any embodiment of the disclosure.

The box retrieval method and apparatus, the system, the robot, and the storage medium provided by the embodiments of the disclosure are applied to a warehouse robot. The spacings between the target box and neighboring objects are detected by acquiring the detection image of the target box to determine whether it is safe for the warehouse robot to perform retrieval, such that automatic detection of the box spacings is realized, the detection cost is low, the deployment is convenient, and the detection accuracy is high, thereby improving the operation safety of the warehouse robot, ensuring goods retrieval and storage safety, and lowering the probability of goods damage and falling down of shelves.

BRIEF DESCRIPTION OF THE DRAWINGS

The accompanying drawings are incorporated in and constitute a part of the description, illustrate embodiments in line with the disclosure and, together with the description, serve to explain the principles of the disclosure.

The foregoing accompanying drawings have shown specific embodiments of the disclosure, which will be described in greater detail hereinafter. The accompanying drawings and written description are not intended to limit the scope of the concept of the disclosure in any way, but rather to illustrate the concept of the disclosure to a person skilled in the art by referring to specific embodiments.

DETAILED DESCRIPTION

Exemplary embodiments will be described in detail herein, examples of which are illustrated in the accompanying drawings. When the following description relates to the accompanying drawings, unless otherwise indicated, the same numbers in different accompanying drawings represent the same or similar elements. The implementations described in the following exemplary embodiments do not represent all implementations consistent with the disclosure. On the contrary, they are merely examples of apparatuses and methods consistent with some aspects of the disclosure as detailed in the appended claims.

The technical solutions of the disclosure and how the technical solutions of the disclosure solve the technical problems are described in detail below with specific embodiments. The following specific embodiments may be combined with each other, and the same or similar concepts or processes may not be described in some embodiments. The following describes the embodiments of the disclosure in combination with the accompanying drawings.

The application scenarios of the embodiments of the present application are described below.

Figure 1:
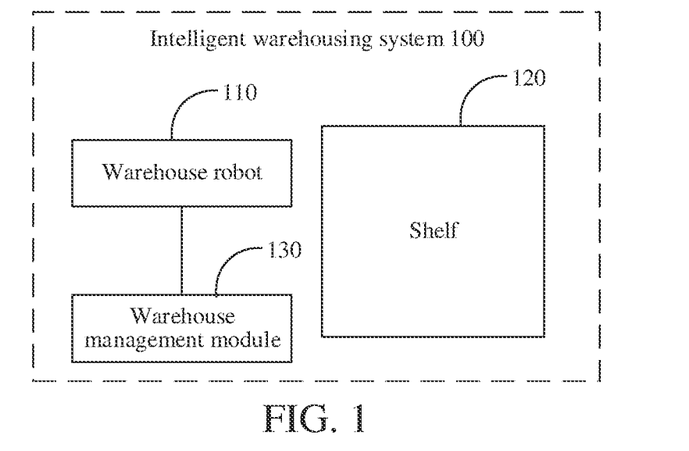
FIG. 1 is a diagram of an application scenario of a box retrieval method provided in embodiments of the disclosure.

FIG. 1 is an application scenario diagram of the box retrieval method provided in embodiments of the disclosure. As shown in FIG. 1, an intelligent warehousing system 100 uses a warehouse robot 110 to retrieve and/or store a target box on a shelf 120, and uses a warehouse management module 130 to carry out path planning, status monitoring, and scheduling on the warehouse robot 110, so that the warehouse robot 110 moves to a set position to retrieve or store the target box. The warehouse management module 130 also stores storage information of each storage space of the shelf 120 and basic information of the target box, so as to facilitate warehouse management.

In the scenario where the warehouse robot retrieves the target box, when distances between the target box and other boxes nearby are close, retrieving the target box directly by the warehouse robot may result in damage to the target box or other boxes, or even lead to falling down and damage of shelves. In order to solve this problem, in the embodiments of the disclosure, an image sensor may be provided on the warehouse robot, and a detection image of the target box may be obtained by the image sensor. The detection image may include an image of the target box and neighboring objects, and whether to retrieve the target box is determined according to a captured detection figure and retrieval conditions, thereby improving the operation safety of the warehouse robot and lowering the probability of goods damage or falling down of shelves.

Figure 2:
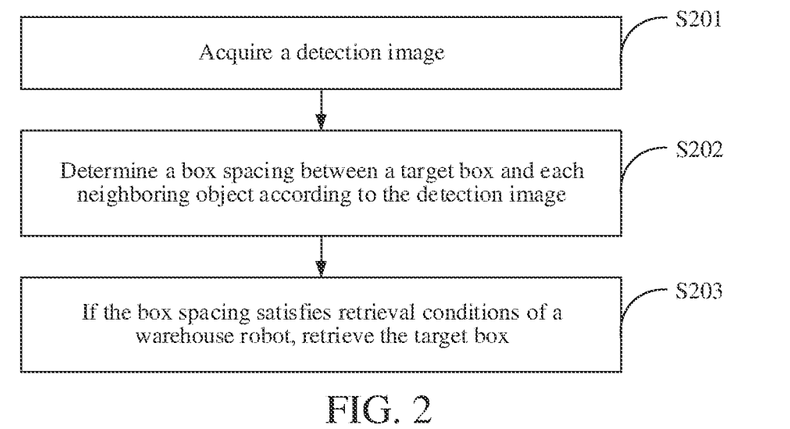
FIG. 2 is a flowchart of a box retrieval method provided in one embodiment of the disclosure.

FIG. 2 is a flowchart of a box retrieval method provided in one embodiment of the disclosure. The box retrieval method may be performed by a warehouse robot or a warehousing system. As shown in FIG. 2, the box retrieval method provided in this embodiment includes the following steps.

At step S201, a detection image is acquired.

The detection image includes an image of a target box and neighboring objects. The target box is the box that the warehouse robot needs to retrieve. boxes often store goods that need to be warehoused, which may be fabrics, food, electronic products, building materials, etc. The target box may also be a carton or other packaging box. No limitation is made thereto in the disclosure. The neighboring objects may be other boxes neighboring to the target box, and when the target box is a box located at an edge of a shelf, the neighboring object may be a side frame of the shelf. There are usually two neighboring objects, i.e., the left and right neighboring objects of the target box.

Specifically, an image sensor, such as a 2D camera, a radar, a depth camera, or a camera, may be used to captured the detection image of target box spacings. There may be one or a plurality of detection images, depending on the field of view of the image sensor. The detection image should include at least an image of the target box and neighboring objects. The neighboring objects may be two boxes respectively at the left and right sides of the target box (when at a middle position), or may be a box and a side frame of a shelf (when at an edge position).

At step S202, a box spacing between the target box and each neighboring object is determined according to the detection image.

The box spacing refers to the distance or relative positional relationship between the target box and each neighboring object, may be the box spacing between the target box and each neighboring box, may also be the box spacing between the target box and a neighboring side frame of a shelf, or may also be the box spacing between the target box and other objects neighboring thereto. When there are a plurality of neighboring objects, the box spacing between the target box and each of the neighboring objects is determined according to the detection image, and the box spacing between the target box and each of the neighboring objects may include the spacing between the target box and each of the neighboring objects, or may be a minimum value among the box spacings. The box spacing may include the width of the spacing between the target box and each neighboring object, and may also include the depth of the spacing.

Optionally, the target box is placed on a shelf; there are two neighboring objects, which are respectively located on the left and right sides of the target box; and the neighboring objects include: two other boxes neighboring to the target box, or one other box neighboring to the target box and a side frame of the shelf neighboring to the target.

Specifically, before retrieving the target box, the location of the target box, feature information such as the contour, shape, special mark, and color of the target box and neighboring objects may be acquired, and algorithms such as feature extraction or target segmentation may be performed on the basis of the detection image to recognize the region or edge information of the target box and neighboring objects, so as to calculate the pixel distance between the target box and each of the neighboring objects, and then according to photography parameters and installation information of the image sensor corresponding to the detection image, determine the physical distance corresponding to the pixel distance, i.e., the box spacing.

Furthermore, the target box is usually in the shape of a cube, and its edges are straight lines, such that edge lines of the target box and neighboring objects in the detection image can be extracted on the basis of a preset edge detection algorithm, and the minimum distance between the edge lines of the target box and the edge lines of a corresponding neighboring object is calculated as the width of the box spacing therebetween.

The preset edge detection algorithm may be Canny algorithm, Sobel operator-based edge detection algorithm, Hough transform-based line detection algorithm, or other self-defined line edge detection algorithms.

At step S203, if the box spacing satisfies the retrieval conditions for the warehouse robot, the target box is retrieved.

The retrieval conditions refer to the conditions that the warehouse robot needs to satisfy when retrieve goods, specifically are spacing conditions of the target box, i.e., the conditions that the box spacing of the target box should meet, which usually include the minimum value of the width of the box spacing and may also include the minimum value of the depth of the box spacing.

Specifically, if the box spacing satisfies the retrieval conditions for the warehouse robot, it is determined that the warehouse robot can retrieve the target box; otherwise, if the box spacing does not satisfy the retrieval conditions for the warehouse robot, the target box is not retrieved.

The box retrieval method provided by this embodiment is applied to the warehouse robot. The spacing between the target box and each neighboring object is detected by acquiring the detection image of the spacing of the target box to determine whether it is safe for the warehouse robot to retrieve goods, such that the automatic detection of the box spacing is realized, the detection cost is low, the deployment is convenient, and the detection accuracy is high, thereby improving the operation safety of the warehouse robot, ensuring the safety of goods retrieval and storage, and lowering the probability of goods damage and falling down of shelves.

Figure 3:
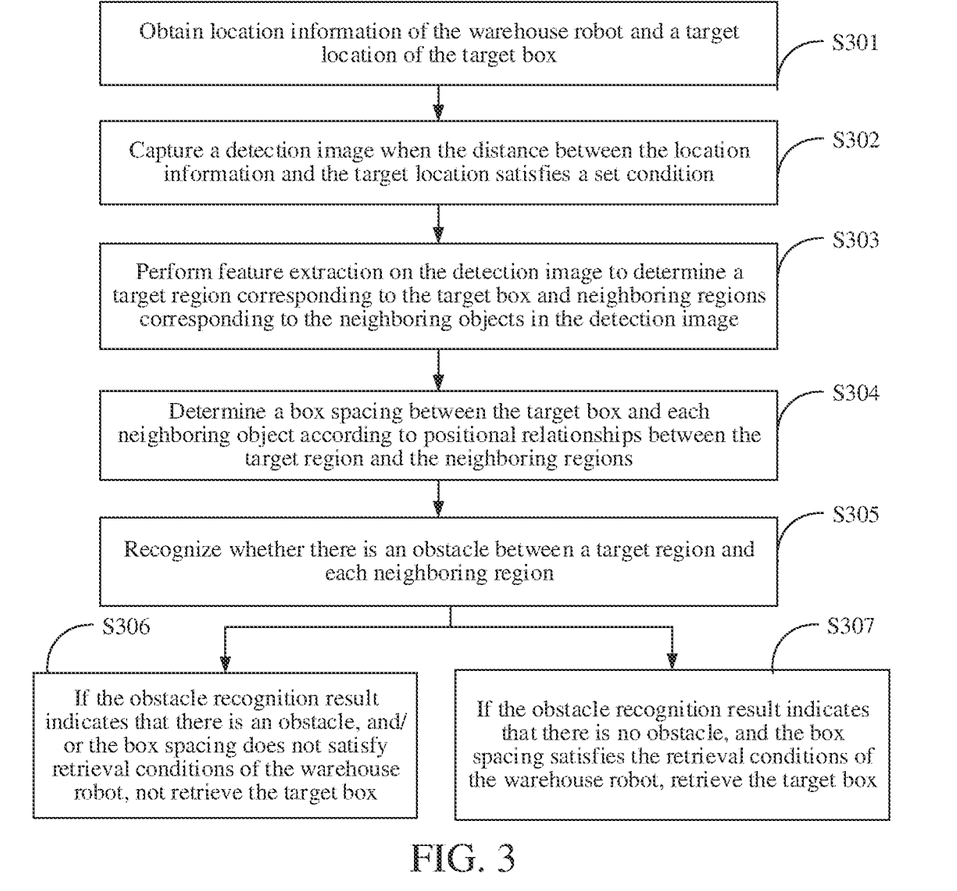
FIG. 3 is a flowchart of a box retrieval method provided in another embodiment of the disclosure.

FIG. 3 is a flowchart of the box retrieval method provided by another embodiment of the disclosure. As shown in FIG. 3, the box retrieval method provided in this embodiment specifies steps S201, S202, and S203 and adds an obstacles recognition step after step S201, on the basis of the box retrieval method provided by the embodiment shown in FIG. 2. The box retrieval method provided in this embodiment may include the following steps.

At step S301, location information of a warehouse robot and a target location of a target box are acquired.

The location information of the warehouse robot is specifically the location information, such as location coordinates, of the warehouse robot in a warehouse. The target location of the target box may be the serial number of the storage space corresponding to the target box and/or location coordinates of the storage space in the warehouse.

Specifically, the location information of the warehouse robot may be monitored or collected in real time by a positioning device in the warehouse robot. The correspondence between the target location of the storage space corresponding to each box and mark information of the box may be established in advance, so as to determine the target location of the storage space corresponding to the target box according to the mark information of the target box.

At step S302, when the distance between the location information and the target location satisfies a set condition, the detection image is captured.

Specifically, when the warehouse robot moves to the target location, i.e., when the location information of the warehouse robot coincides with the target location of the target box, the detection image of the target box is captured. Alternatively, when the distance between the location information of the warehouse robot and the target location of the target box is less than a set distance threshold, an image sensor is turned on to capture the detection image of the target box. The set distance threshold may be 0.2 m, 0.5 m, 1 m, or other values, which may be determined according to parameters such as the moving speed of the warehouse robot, the size of the target box, and the turn-on time of the image sensor.

When the warehouse robot approaches a target storage space where the target box is located, the image sensor is turned on in advance to capture the detection image, such that image collection efficiency is improved.

At step S303, feature extraction is performed on the detection image to determine a target region corresponding to the target box and neighboring regions corresponding to the neighboring objects in the detection image.

Specifically, feature information, including contour features, special mark features, color features, etc., of the target box and neighboring objects may be obtained in advance. The special mark features may be mark information such as barcodes and QR codes of the target box or neighboring objects, or may also be a special pattern information, texture information, or text information for distinguishing, such as a unique product mark and a product code on the target box. Therefore, according to the above-mentioned feature information, feature extraction is performed on the detection image to recognize the regions corresponding to the target box and to the neighboring objects in the detection image.

Furthermore, target recognition and separation may be performed on the detection image on the basis of a deep learning algorithm to determine the target region corresponding to the target box and the neighboring regions corresponding to the neighboring objects in the detection image.

Furthermore, before performing feature extraction on the detection image, the method may also include:

preprocessing the detection image.

The preprocessing includes one or more of converting a color image into a grayscale image, binarization, and image filtering.

Specifically, image filtering processing may be to apply filtering algorithms such as Gaussian filtering, mean filtering, and median filtering to reduce noise of the detection image.

At step S304, a box spacing between the target box and each neighboring object is determined according to positional relationships between the target region and the neighboring regions.

Specifically, target feature recognition is performed on the target region where the target box is located and the neighboring regions corresponding to each neighboring objects to determine edge positions of the target region and each neighboring region, where the target feature may be a straight edge of each box, a specific image of a surface of the box, etc. Furthermore, a retrieval spacing between the target box and the warehouse robot may be determined according to the edge positions of the target box in the target region, and the box spacing between the target box and each of the neighboring objects may be determined according to the edge positions of the target box and the neighboring objects.

At step S305, whether there is an obstacle between the target region and each neighboring region is recognized.

Obstacles refer to objects located between the target box and neighboring objects, and may be goods that fall into the spacing of the target box, or items that appear due to manual operation errors.

Specifically, after determining the target region where the target box is located in the detection image and the neighboring region where each neighboring object is located, the region between the two regions is determined as an obstacle recognition region, and obstacle recognition is performed for the obstacle recognition region to determine whether there is an obstacle.

Specifically, obstacle recognition may be performed on the basis of a neural network algorithm, or feature extraction may be performed on the obstacle recognition region to determine whether there is an obstacle according to whether the feature extraction result includes a closed region having an area greater than a set value or whether there is a specific figure. Certainly, other algorithms may also be used for obstacle recognition. No limitation is made thereto in the disclosure.

The step of obstacle recognition, that is, step S305, may also be carried out before step S304, or be performed in parallel with spacing detection (step S304).

At step S306, if the obstacle recognition result indicates that there is an obstacle, and/or the box spacing does not satisfy the retrieval conditions for the warehouse robot, the target box is not retrieved.

Specifically, when there is an obstacle, while controlling the warehouse robot not to retrieve the target box, obstacle prompt information, such as "there is an obstacle" and "please remove the obstacle", may also be generated so that relevant personnel can remove the obstacle according to the prompt information.

Specifically, if there is no obstacle, but the box spacing does not satisfy the retrieval conditions for the warehouse robot, while controlling the warehouse robot not to retrieve the target box, spacing prompt information, such as "spacing is too small", may also be generated so that the relevant personnel can adjust the box according to the prompt information.

Specifically, when the obstacle recognition result indicates that there is no obstacle, whether the box spacing satisfies the retrieval conditions for the warehouse robot is determined; if so, the target box is retrieved; and if not, the target box is not retrieved, and spacing prompt information is generated. The spacing prompt information may include the determination result, the value of the spacing that does not satisfy the preset conditions, and a corresponding prompt sentence, such as "please perform human intervention", "the spacing is too small", and "the box spacing exceeds the safe range".

Furthermore, the prompt information (spacing prompt information and/or obstacle prompt information) may be sent to a user terminal, the warehouse management module, or a processor of the warehouse robot. When there is an obstacle or the box spacing and the retrieval distance do not satisfy the retrieval conditions for the warehouse robot, the warehouse robot is controlled not to retrieve the target box, and a scheduling instruction sent by the user terminal or the warehouse management module or by a user by an operation interface of the robot may also be received, and the warehouse robot may be controlled according to the scheduling instruction.

The scheduling instruction may include an in-situ standby instruction, a moving instruction, an instruction to skip a current box, etc. accordingly, when the scheduling instruction is an in-situ standby instruction, the warehouse robot is controlled to maintain a current posture, that is, no action is performed; when the scheduling instruction is a moving instruction, the warehouse robot is controlled to move to a target point according to the moving instruction; and when the scheduling instruction is an instruction to skip the current box, the warehouse robot is controlled to retrieve the next target box, that is, the retrieval of the current target box is skipped.

At step S307, if the obstacle recognition result indicates that there is no obstacle, and the box spacing satisfies the retrieval conditions for the warehouse robot, the target box is retrieved.

Optionally, the retrieval conditions include a preset width threshold and a preset depth threshold, the box spacing includes a spacing width and a spacing depth, and the box spacing satisfying the retrieval conditions for the warehouse robot includes: the spacing width is greater than the preset width threshold, and the spacing depth is greater than the preset depth threshold.

The spacing depth refers to the length of the spacing in the extension direction of a goods retrieval device of the warehouse robot. The preset width threshold and the preset depth threshold may be determined according to the goods retrieval device of the warehouse robot, and the goods retrieval device may be a fork, a robotic arm, a gripping device, or the like. For example, when the goods retrieval device is a fork, the preset width threshold may be determined according to the size of the fork. Specifically, the preset width threshold may be equal to the width of a fork arm plus a certain safety distance such as 5% or 10% of the width of the fork arm, and the preset depth threshold may be equal to the depth of the fork arm plus a certain safety distance.

By recognizing whether there is an obstacle in the box spacing on the basis of the detection image, the comprehensiveness and intelligence of the detection are improved, and the safety of goods retrieval by the warehouse robot is further increased.

In this embodiment, detection image capturing is triggered by the distance between the location information of the warehouse robot and the target location of the target box so as to realize automatic image capturing, thereby increasing the automation degree of spacing detection. Whether there is an obstacle in the spacings of the target box and whether each spacing of the target box satisfies the retrieval conditions by the steps of feature extraction and edge detection performed on the detection image, the automatic detection of the state of the target box before goods retrieval is realized, the detection is comprehensive and convenient, and the safety of automatic goods retrieval is improved.

Figure 4:
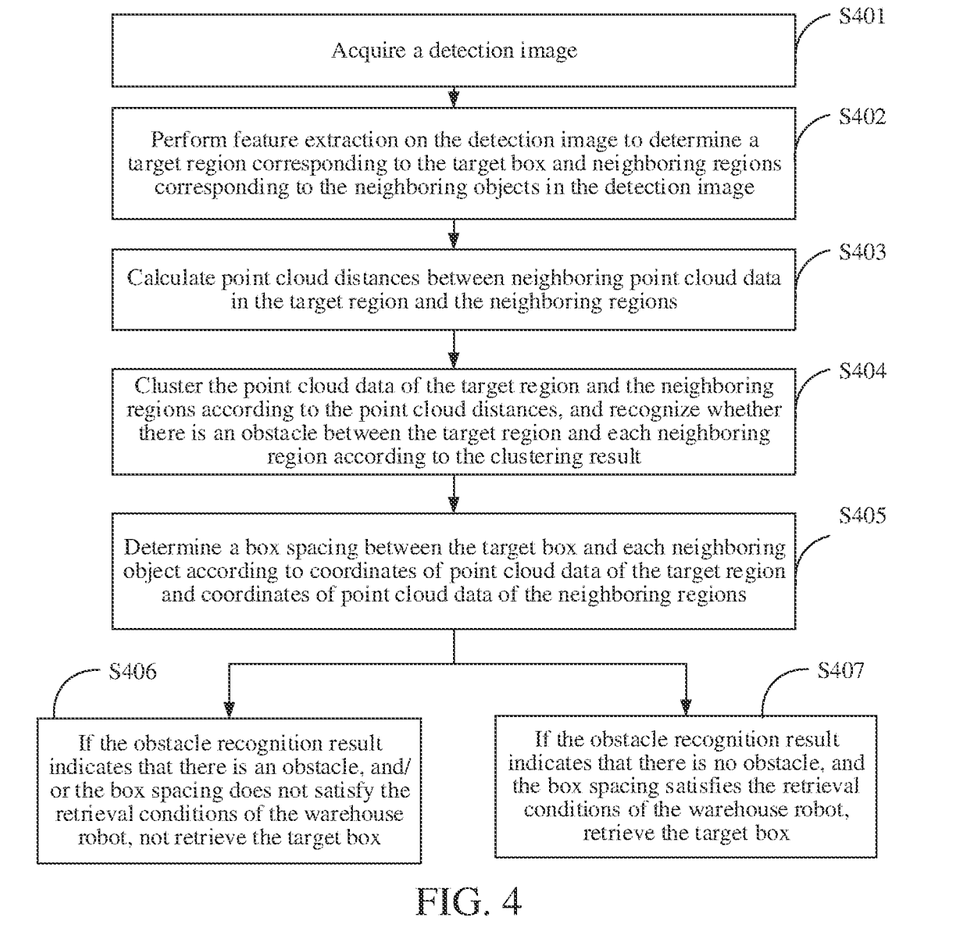
FIG. 4 is a flowchart of a box retrieval method provided in a further one embodiment of the disclosure.

FIG. 4 is a flowchart of a box retrieval method provided in a further embodiment of the disclosure. In this embodiment, a detection image is captured by a depth camera or a radar. The detection image is composed of point cloud data, as shown in FIG. 4, the box retrieval method includes the following steps.

At step S401, a detection image is acquired.

The detection image includes an image of a target box and neighboring objects, and the detection image is point cloud data collected by a depth camera or radar. The depth camera, also known as a 3D camera, can detect the depth of field distance of the photography space. The point cloud data includes not only grayscale information of pixels, but also three-dimensional coordinate information of the pixels.

Furthermore, after acquiring the detection image, the detection method further includes:

performing sampling processing and noise reduction processing on the point cloud data of the detection image.

Specifically, the sampling processing may be down-sampling processing, up-sampling processing, or uniform sampling processing, and the algorithm used in the noise reduction processing may be: bilateral filtering, Gaussian filtering, binning noise reduction, KD-Tree algorithm, pass-through filtering, random sample consensus filtering, etc.

At step S402, feature extraction is performed on the detection image to determine a target region corresponding to the target box and neighboring regions corresponding to the neighboring objects in the detection image.

At step S403, point cloud distances between the neighboring point cloud data in the target region and the neighboring regions are calculated.

The point cloud distance is the distance between coordinate information corresponding to the two-point cloud data.

Specifically, the region between the target region and each neighboring region is the region where the spacing between the target box and a neighboring box or a side frame of a shelf is located. The point cloud distances between the point cloud data of neighboring points in the region are calculated according to the coordinate information of the point cloud data.

At step S404, the point cloud data of the target region and the neighboring regions are clustered according to the point cloud distances, and whether there is an obstacle between the target region and each neighboring region is recognized according to the clustering result.

Specifically, the points having point cloud distances less than a preset distance value may be regarded as point cloud data of the same object to be clustered.

Furthermore, object recognition may also be performed on the clustering result on the basis of a deep learning algorithm to determine whether there is an obstacle according to the recognition result.

Specifically, after clustering, if there is an object of a set category between the target region and the neighboring region, it is considered that there is an obstacle in a retrieval path, such as a helmet, a glove, etc.

At step S405, the box spacing between the target box and each neighboring object is determined according to coordinates of point cloud data of the target region and coordinates of point cloud data of the neighboring regions.

Specifically, the target box has a left neighboring object and a right neighboring object. The left neighboring object corresponds to a left neighboring region, and the right neighboring object corresponds to a right neighboring region. The spacing between the target box and the neighboring object may be determined according to the average distance or minimum distance between the point cloud data of the left side of the target region and the point cloud data of the right side of the left neighboring region (the width of the box spacing), and accordingly, the spacing between the target box and the neighboring object may be determined according to the average distance or the minimum distance of the point cloud data of the right side of the target region and the left side of the left neighboring region. The depth of the box spacing may be calculated according to coordinates of first point cloud data between the target region and each neighboring region in the direction of the depth of the box spacing, i.e., the extension direction of the goods retrieval device of the warehouse robot. If the calculated depth of the box spacing is greater than the depth of the target box, the depth of the target box is determined as the depth of the box spacing.

At step S406, if the obstacle recognition result indicates that there is an obstacle, and/or the box spacing does not satisfy the retrieval conditions for the warehouse robot, the target box is not retrieved.

At step S407, if the obstacle recognition result indicates that there is no obstacle, and the box spacing satisfies the retrieval conditions for the warehouse robot, the target box is retrieved.

In this embodiment, for the detection image composed of the point cloud data of the target box collected by the depth camera, the region of the target box and the neighboring object is determined by feature extraction, and then spacing information can be determined according to point cloud coordinates in the region, whether retrieval conditions are satisfied according to the spacing information, and whether there is an obstacle is determined by point cloud clustering, such that the automatic detection of the state of the target box before goods retrieval is realized, the detection is comprehensive and convenient, and the safety of automated retrieval is improved.

Figure 5:
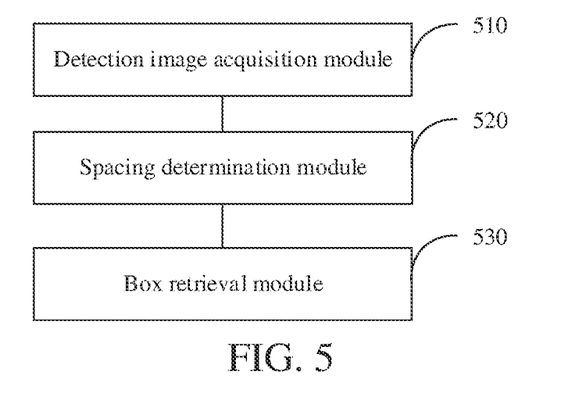
FIG. 5 is a schematic structural diagram of a box retrieval apparatus provided in one embodiment of the disclosure.

FIG. 5 is a schematic structural diagram of a box retrieval apparatus provided in an embodiment of the disclosure. As shown in FIG. 5, the box retrieval apparatus provided by this embodiment includes: a detection image acquisition module 510, a spacing determination module 520, and a box retrieval module 530.

The detection image acquisition module 510 is configured to acquire a detection image, where the detection image includes an image of a target box and neighboring objects; the spacing determination module 520 is configured to determine a box spacing between the target box and each neighboring object according to the detection image; and the box retrieval module 530 is configured to retrieve the target box if the box spacing satisfies retrieval conditions for a warehouse robot.

Optionally, the detection image acquisition module 510 is further configured to:
  acquiring location information of the warehouse robot and a target location of the target box; and capturing the detection image when the distance between the location information and the target location satisfies a set condition.

Optionally, the spacing determination module 520 includes:
  a target region determination unit configured to perform feature extraction on the detection image to determine a target region corresponding to the target box and neighboring regions corresponding to the neighboring objects in the detection image; and a box spacing determination unit configured to determine a box spacing between the target box and each neighboring object according to positional relationships between the target region and the neighboring regions.

Optionally, the detection image is an image composed of point cloud data, and the box spacing determination unit is further configured to: determine the box spacing between the target box and each neighboring object according to coordinates of point cloud data of the target region and coordinates of point cloud data of the neighboring regions.

Optionally, the box retrieval apparatus further includes:
  a first obstacle recognition module configured to, after determining the target region corresponding to the target box and the neighboring regions corresponding to the neighboring objects in the detection image, calculate point cloud distances between neighboring point cloud data in the target region and the neighboring regions, and cluster the point cloud data of the target region and the neighboring regions according to the point cloud distances and recognize, according to the clustering result, whether there is an obstacle between the target region and each neighboring region; and accordingly, the box retrieval module 530 further configured to: if the obstacle recognition result indicates that there is an obstacle, and/or the box spacing does not satisfy the retrieval conditions for the warehouse robot, not retrieve the target box; and if the obstacle recognition result indicates that there is no obstacle, and the box spacing satisfies the retrieval conditions for the warehouse robot, retrieve the target box.

Optionally, the box retrieval apparatus further includes: a second obstacle recognition module configured to, after determining the target region corresponding to the target box and the neighboring regions corresponding to the neighboring objects in the detection image, recognize whether there is an obstacle between the target region and each neighboring region; and accordingly, the box retrieval module 530 further configured to: if the obstacle recognition result indicates that there is an obstacle, and/or the box spacing does not satisfy the retrieval conditions for the warehouse robot, not retrieve the target box; and if the obstacle recognition result indicates that there is no obstacle, and the box spacing satisfies the retrieval conditions for the warehouse robot, retrieve the target box.

Optionally, the retrieval conditions include a preset width threshold and a preset depth threshold, and the box spacing includes spacing width and spacing depth. The box retrieval module 530 is further configured to:

if the spacing width is greater than the preset width threshold, and the spacing depth is greater than the preset depth threshold, retrieve the target box.

Figure 6:
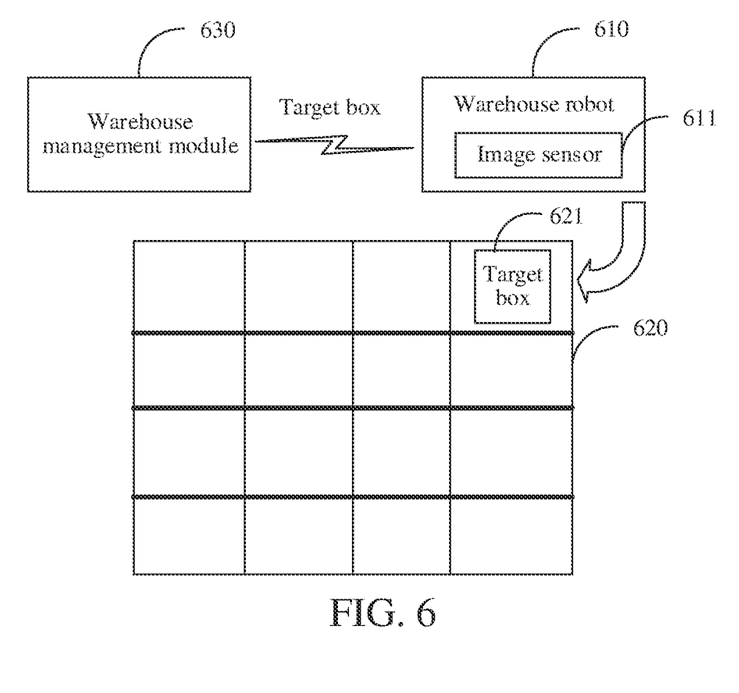
FIG. 6 is a schematic structural diagram of a warehousing system provided in one embodiment of the disclosure.

FIG. 6 is a schematic structural diagram of a warehousing system provided by an embodiment of the disclosure. As shown in FIG. 6, a box retrieval system includes: a warehouse robot 610, a shelf 620, and a warehouse management module 630.

The warehouse robot 610 is connected to the warehouse management module 630 and is configured to move to and retrieve and/or store a target box 621 according to instructions of the warehouse management module 630. The warehouse robot 610 is provided with an image sensor 611. The image sensor 611 is configured to acquire a detection image. The detection image includes an image of the target box and neighboring objects. The target box 621 is placed on the shelf 620. The warehouse management module 630 is configured to receive the detection image and perform the box retrieval method provided by any embodiment of the disclosure.

Optionally, the image sensor 611 is disposed on a goods retrieval device of the warehouse robot 610.

The goods retrieval device may be a fork, a robotic arm, a gripping device, or the like. The image sensor 610 should face a goods retrieval/storage region.

Optionally, the image sensor 611 includes at least one of a 2D camera, a radar, and a depth camera.

Specifically, the 2D camera may be a monochrome camera or a color camera, and the depth camera is also called a 3D camera, and may be a binocular camera, a structured light-based depth camera, or a time-of-flight-based depth camera.

Figure 7:
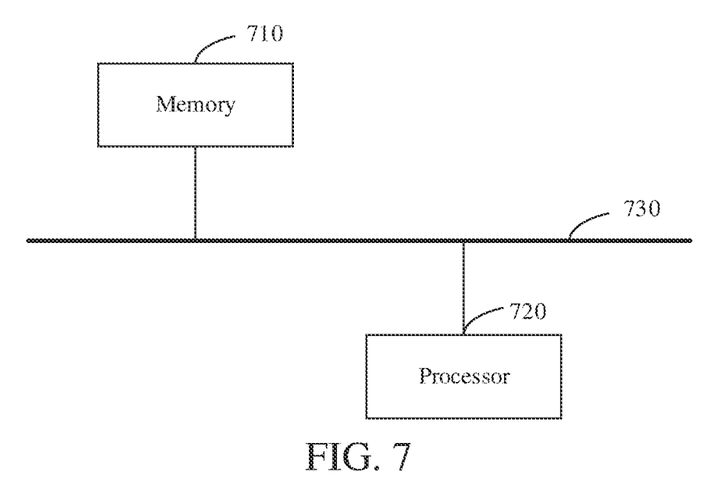
FIG. 7 is a schematic structural diagram of a warehouse robot provided in one embodiment of the disclosure.

FIG. 7 is a schematic structural diagram of a warehouse robot according to an embodiment of the disclosure. As shown in FIG. 7, the warehouse robot includes: a memory 710, a processor 720, and a computer program.

The computer program is stored in the memory 710 and configured to be executed by the processor 720 to implement the box retrieval method provided by any one of the embodiments corresponding to FIG. 2 to FIG. 4 of the disclosure.

The memory 710 and the processor 720 are connected to each other by a bus 730.

The relevant descriptions can be understood by referring to the relevant descriptions and effects corresponding to the steps in FIG. 2 to FIG. 4. Details are not described herein again.

Specifically, the warehouse robot also includes a mobile device, a lifting/lowering platform, a goods retrieval device, etc., where the mobile device and the lifting/lowering platform are configured to move to a set height of a target location according to a movement control instruction of a control module; and the goods retrieval device is configured to retrieve a target box according to a goods retrieval control instruction of the control module. An image sensor may also be included to capture a detection image of the target box. The processor 720 includes a box retrieval module configured to receive the detection image, perform the box retrieval method provided by any embodiment of the disclosure, and generate a determination result; and a control module connected to the mobile device, the lifting/lowering platform, and the box retrieval module, and configured to generate a movement control instruction according to location information of the target box, receive the determination result, and when the determination result is to retrieve the target box, generate a goods retrieval control instruction.

In addition, an embodiment of the disclosure also provides a computer-readable storage medium having a computer program stored thereon. When the computer program is executed by a processor, the box retrieval method provided by any one of the embodiments corresponding to FIG. 2 to FIG. 4 of the disclosure is implemented.

The computer-readable storage medium may be a ROM, a random access memory (RAM), a CD-ROM, a magnetic tape, a floppy disk, an optical data storage device, and the like.

It should be understood that the disclosed apparatus and method in the embodiments provided in the disclosure may be implemented in other ways. For example, the apparatus embodiments described above are merely exemplary. For example, the module division is merely logical function division and may be other division in actual implementation. For example, a plurality of modules or components may be combined or integrated into another system, or some features may be ignored or not performed. In addition, the shown or discussed mutual couplings or direct couplings or communication connections may be implemented by some interfaces. The indirect couplings or communication connections between devices or modules may be electrical and mechanical, or in other forms.

A person skilled in the art may easily conceive of other implementation solutions of the disclosure after considering the description and practicing the application disclosed herein. The disclosure intends to cover any variations, uses, or adaptive changes of the disclosure. These variations, uses, or adaptive changes comply with general principles of the disclosure, and include common general knowledge or common technical means in the art that are not disclosed in the disclosure. The description and embodiments are merely considered to be exemplary, and the actual scope and spirit of the disclosure are pointed out in the appended claims.

It should be understood that an accurate structure that is described above and shown in the drawings is not limited in the disclosure, and can be modified and changed in every way without departing from the scope thereof. The scope of the disclosure is limited only by the appended claims.

What is claimed is:

1. A box retrieval method, applied to a warehouse robot, wherein the method comprises:
   acquiring a detection image, wherein the detection image comprises an image of a target box and neighboring objects;
   determining a box spacing between the target box and each neighboring object according to the detection image; and
   if the box spacing satisfies retrieval conditions for the warehouse robot, retrieving the target box;
   wherein the determining a box spacing between the target box and each neighboring object according to the detection image comprises:
   performing feature extraction on the detection image to determine a target region corresponding to the target box and neighboring regions corresponding to the neighboring objects in the detection image; and
   determining the box spacing between the target box and each neighboring object according to positional relationships between the target region and the neighboring regions.

2. The method according to claim 1, wherein after determining the target region corresponding to the target box and the neighboring regions corresponding to the neighboring objects in the detection image, the method further comprises:
   recognizing whether there is an obstacle between the target region and each neighboring region; and
   accordingly, if the box spacing satisfies the retrieval conditions for the warehouse robot, the retrieving the target box comprises:
   if a result of the obstacle recognition indicates that there is no obstacle, and the box spacing satisfies the retrieval conditions for the warehouse robot, retrieving the target box.

3. The method according to claim 1, wherein the detection image is an image composed of point cloud data, and the determining the box spacing between the target box and each neighboring object according to positional relationships between the target region and the neighboring regions comprises:
   determining the box spacing between the target box and each neighboring object according to coordinates of point cloud data of the target region and coordinates of point cloud data of the neighboring regions.

4. The method according to claim 3, wherein after determining the target region corresponding to the target box and the neighboring regions corresponding to the neighboring objects in the detection image, the method further comprises:
   calculating point cloud distances between neighboring point cloud data in the target region and the neighboring regions; and
   clustering the point cloud data of the target region and the neighboring regions according to the point cloud distances, and recognizing, according to a result of the clustering, whether there is an obstacle between the target region and each neighboring region; and
   accordingly, if the box spacing satisfies the retrieval conditions for the warehouse robot, the retrieving the target box comprises:
   if the result of the obstacle recognition indicates that there is no obstacle, and the box spacing satisfies the retrieval conditions for the warehouse robot, retrieving the target box.

5. The method according to claim 1, wherein the retrieval conditions comprise a preset width threshold and a preset depth threshold, the box spacing comprises spacing width and spacing depth, and the box spacing satisfying the retrieval conditions for the warehouse robot comprises:
   the spacing width is greater than the preset width threshold, and the spacing depth is greater than the preset depth threshold.

6. The method according to claim 1, wherein the acquiring a detection image comprises:
   capturing a detection image of target box spacings by an image sensor.

7. The method according to claim 1, wherein the acquiring a detection image comprises:
   acquiring location information of the warehouse robot and a target location of the target box; and
   capturing the detection image when the distance between the location information and the target location satisfies a set condition.

8. The method according to claim 1, wherein the target box is placed on a shelf, and the neighboring objects comprise: two other boxes neighboring to the target box, or one other box neighboring to the target box and a side frame of the shelf neighboring to the target box.

9. A box retrieval apparatus, applied to a warehouse robot, wherein the apparatus comprises:
   a detection image acquisition module configured to acquire a detection image, wherein the detection image comprises an image of a target box and neighboring objects;
   a spacing determination module configured to determine a box spacing between the target box and each neighboring object according to the detection image; and
   a box retrieval module configured to retrieve the target box if the box spacing satisfies retrieval conditions for the warehouse robot;
   wherein the retrieval conditions comprise a preset width threshold and a preset depth threshold, the box spacing comprises spacing width and spacing depth, and the box spacing satisfying the retrieval conditions for the warehouse robot comprises:
   the spacing width is greater than the preset width threshold, and the spacing depth is greater than the preset depth threshold.

10. A warehousing system, wherein the system comprises: a warehouse robot, a shelf, and a warehouse management module,
    wherein the warehouse robot is connected to the warehouse management module and is configured to move and to retrieve and/or store a target box according to instructions of the warehouse management module, the warehouse robot is provided with an image sensor, the image sensor is configured to capture a detection image, the detection image comprises an image of the target box and neighboring objects, and the target box is placed on the shelf; and
    the warehouse management module is configured to receive the detection image and to perform the box retrieval method according to claim 1.

11. The system according to claim 10, wherein the image sensor is disposed on a goods retrieval device of the warehouse robot.

12. The system according to claim 10, wherein the image sensor comprises at least one of a 2D camera, a radar, and a depth camera.

\* \* \* \* \*